March 28, 1950     C. DUDLEY     2,501,893
PIPE BEVELING MACHINE
Filed July 14, 1948     2 Sheets-Sheet 1
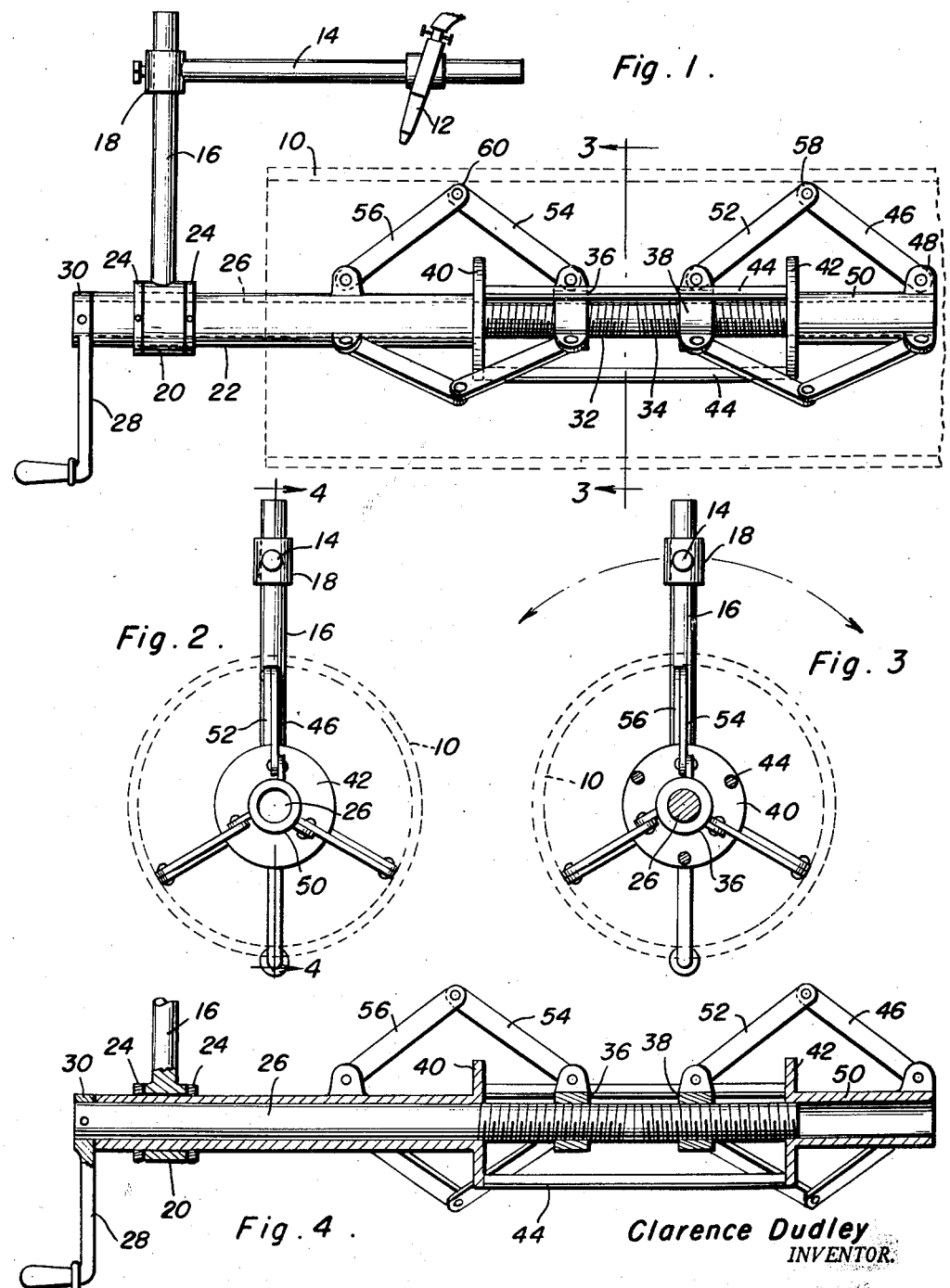
Clarence Dudley
INVENTOR.

March 28, 1950 — C. DUDLEY — 2,501,893
PIPE BEVELING MACHINE
Filed July 14, 1948 — 2 Sheets-Sheet 2

Clarence Dudley
INVENTOR.

Patented Mar. 28, 1950

2,501,893

UNITED STATES PATENT OFFICE 2,501,893

PIPE BEVELING MACHINE

Clarence Dudley, Breckenridge, Tex., assignor of one-half to Joseph F. Francis, Breckenridge, Tex.

Application July 14, 1948, Serial No. 38,700

5 Claims. (Cl. 33—21)

This invention relates generally to supports, and more particularly to a device for holding a blow torch in proper relation with the end of a pipe during the simple cutting or beveling of the pipe.

A primary object of this invention is to provide a cutting torch support which will allow the holding of the torch at the proper distance measured radially from the center of a pipe and at the desired angle with reference to the pipe in order that a simple cut or a bevel may be made in the pipe.

Another object of this invention is to provide a device of the class mentioned above which can be very easily inserted into and removed from the pipe wherewith it is to be used, this feature being fully set forth in the following specification and claims.

Another object of this invention is to provide a device for holding a cutting blow torch which can be used with a large number of different sized pipes, the adaptation of the device for use with very large or very small pipes necessitating only the provision of a small number of parts in different sizes from those sizes used most extensively in the trade.

Still another object of this invention is to provide a device of this character which can be manufactured with very little precision machine work, and in which the parts which are most subject to wear are easily replaced.

Yet another object of this invention is to provide a device of this character which can be used without any special racks for the pipe or torch.

Another object is to provide a support for a torch used in cutting pipes, so constructed and arranged that the device can be collapsed into relatively small space for transportation and storage purposes.

And a last object to be mentioned specifically is to provide a device of this character which is relatively inexpensive and practicable to manufacture, all the parts being capable of being fabricated by ordinary machine processes, which is extremely simple, safe and convenient to operate, and which will give generally efficient and durable service.

With these objects definitely in view, this invention resides in certain novel features of construction, combination and arrangement of elements and portions hereinafter described in detail in the specification, particularly pointed out in the appended claims, and illustrated in the accompanying drawings which form a material part of this application, and in which:

Figure 1 is a side elevational view of the assembled device, and the figure includes a length of pipe shown in dash line;

Figure 2 is an end view of the device;

Figure 3 is a transverse vertical sectional view, taken on the line 3—3 in Figure 1;

Figure 4 is a longitudinal sectional view of the device;

Similar characters of reference designate similar or identical elements and portions throughout the specification and throughout the several views in the drawings.

Figure 5:
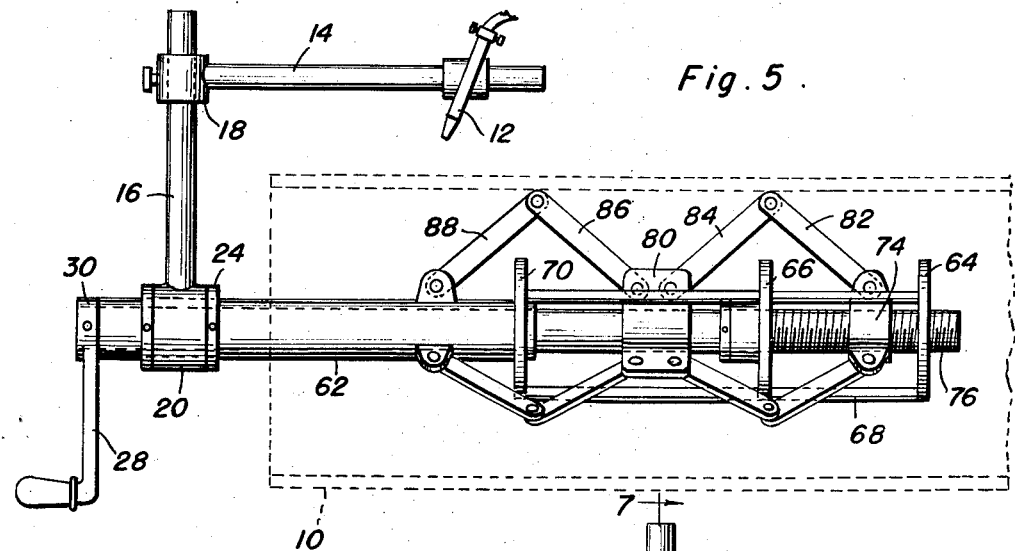
Figure 5 is an elevational view of a modified form of this invention.

Referring now to the drawings in detail, this invention is used in connection with a pipe 10 and a torch 12 is longitudinally adjustably mounted on an arm which is in two parts, the torch 12 being carried on the part 14 of this arm, while the part 14 is radially adjustable relative to the axis of the device by means of a sleeve 18 sliding on the other part 16 of the arm, the sleeve being tightenable in position by a set screw. The part 16 of the arm is provided with a bearing member 20 which is rotatably mounted upon what will be hereinafter referred to as the axial member 22, and a pair of collars 24 are pinned to the axial member 22 on each side of the bearing member 20. An elongated member which will be referred to as simply as the screw 26 is coaxially mounted within the axial member 22 and is turned by a crank 28 having an attachment boss 30 which will abut one end, that is, the outer end, of the axial member 22 to limit the movement of the screw in one direction longitudinally of the axial member.

Portions 32 and 34 of the screw 26 are oppositely threaded in the preferred embodiment of this invention illustrated in Figures 1, 2, 3 and 4. The axial member 22 includes a frame having transversely disposed plates 40 and 42 functioning as stop members for a pair of travelers 36 and 38 threaded on the portions 32 and 34, respectively. The stop members 40 and 42 are joined by longitudinally disposed rods 44.

In this embodiment of the invention, the toggles hereinafter described are provided in two sets, a plurality of links 46 being pivoted on lugs 48 on an extending portion 50 of the axial member 22, and cooperating links 52 are pivoted to the links 46 and to the traveler 38 which has lugs provided therefor. A similar set of toggle instrumentalities is represented by the links 54 and 56 which are pivoted to the traveler 36 and to lugs provided on an intermediate portion of the axial member 22, respectively. The knee joint portions 58 and 60 of the different sets of toggles directly contact the bore surface of the pipe 10, and it will be clear that when the screw 26 is rotated within the axial member 22, the knee joints 58 and 60 will be expanded simultaneously, and since the links mentioned above will ordinarily be all of equal length, the knee joints 58 and 60 will be expanded equally so that the axial member and the parts carried thereby will be properly centered within the pipe 10.

Figure 6:
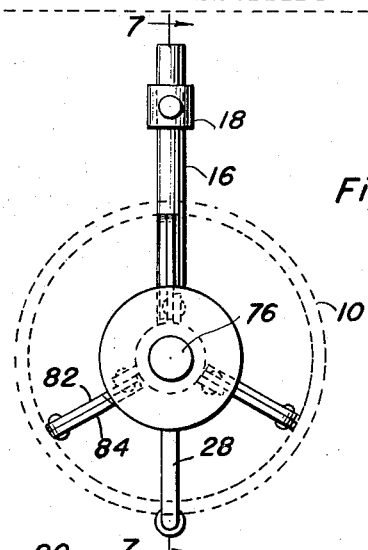
Figure 6 is an end view of this modified form.
Figure 7:
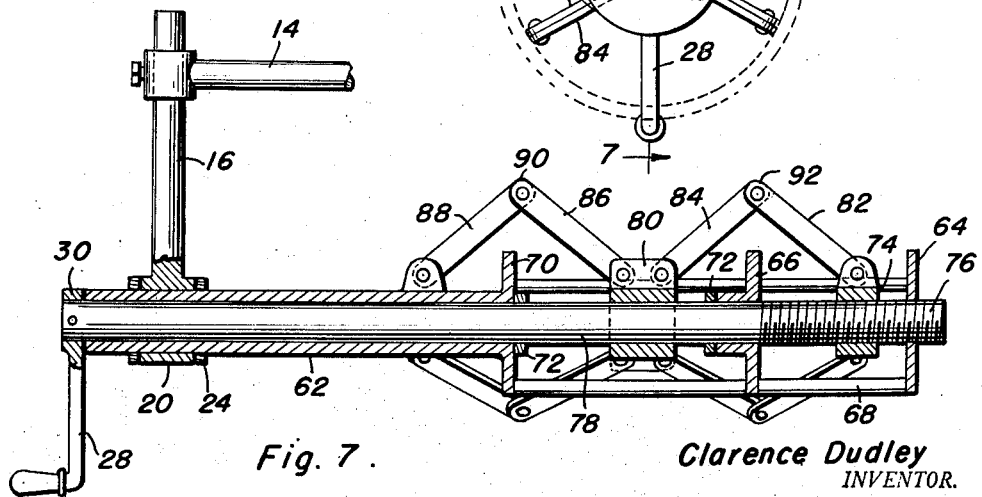
Figure 7 is a longitudinal sectional view of the modified form illustrated in Figures 5 and 6.

Considering now the modified form of this invention illustrated in Figures 5, 6 and 7, it will be first noted that the means concerned directly with the carrying of the torch 12 are now affected by the modification. However, the axial member 62 is slightly changed, stops 64 and 66 being disposed on the inner end of the axial member, in spaced relation, the stop 64 being rigidly secured to longitudinally extending rods 68 which connect another transverse plate member 70 with the stops 64 and 66. In this connection it should be noted that the stop 64 and the stop 66 limit the movement of a single traveler 74 threaded on a threaded end portion 76 of the screw provided in this modified form of the invention. This screw is prevented from shifting longitudinally of the axial member 62 by a boss attachment member 30 on the crank 28 which abuts one end of the axial member 62 and a pair of collars 72 pinned to the screw and in frictional engagement with the plate 70 and a neck or collar portion which may be formed integral with the stop 66. The portion 78 of this screw is, of course, unthreaded and a sleeve 80 slides freely on this portion 78. The toggle assembly includes links 82 pivoted at one end to the traveler 74 and pivoted at the other end to links 84 which are, in turn, pivoted to the sleeve 80. Similar links 86 and 88 are connected together at a knee joint 90 and are also pivoted to the sleeve 80 and an intermediate portion of the axial member 62, respectively. The other knee joint 92 performed by each pair of links 82 and 84, and the knee joint 90 are each forced outwardly when the screw is turned relative to the axial member 62, force being applied to the links 86 through the links 84 and the sleeve 80, so that the knee joints are all forced outwardly equally and simultaneously to center the device within a pipe 10.

The operation of this invention will be clearly understood from a consideration of the foregoing description of the mechanical details thereof, taken in connection with the drawings and with the above recitation of objects sought to be achieved by this invention. Further description of the invention is, therefore, demed unnecessary.

Obviously, many minor varations may be made in the exact construction and proportionment of the various elements of this invention without departure from the spirit thereof and this invention should be limited in scope only as determined by a proper interpretation of the subjoined claims.

Having described the invention, what is claimed as new is:

1. Means securable to a pipe to support a blow torch and an arm whereon said torch is adjustably mounted, an axial member whereon said arm is rotatably mounted, and means to center said axial member in a workpiece pipe comprising a male screw axially and rotatably mounted in said axial member, means to prevent longitudinal movement of the screw in one direction relative to said axial member, expanding toggle centering means coacting with said screw and axial member and contacting the bore surface, said toggle means comprising sets of knee joint toggles spaced longitudinally of said axial member.

2. A device according to claim 1, and wherein knee joint portions of said toggle centering means directly contact the bore of said pipe.

3. In a self-centering support for a pipe cutting torch, an axial member, a screw axially mounted in said member, toggle centering means operatively mounted on said member and screw and having knee joint portions for directly contacting the bore surface of a pipe work piece at a plurality of points spaced longitudinally of said axial member, said screw being threaded in one direction only and said means comprises two sets of radially expanding toggles spaced longitudinally of said axial member, certain of the arms of said toggles having a common traveler threaded on said screw, certain others of the arms of said toggles having a common traveler sliding freely on said screw, and still other arms of said toggles being pivoted on said axial member.

4. A device according to claim 3 and wherein said axial member has stops for said first mentioned traveler on that portion of the axial member which is to be inserted in a pipe.

5. A device according to claim 3, and wherein the innermost set is directly connected to said first mentioned traveler so that the initial normal rough centering of the device in the pipe before the screw is turned to lock the device in the pipe is facilitated.

CLARENCE DUDLEY.

REFERENCES CITED

The following references are of record in the file of this patent:

UNITED STATES PATENTS

| Number | Name | Date |
|---|---|---|
| 725,874 | Riley | Apr. 21, 1903 |
| 1,856,470 | Day | May 3, 1932 |
| 2,054,925 | Bucknam et al. | Sept. 22, 1936 |
| 2,323,039 | Hill | June 29, 1943 |

FOREIGN PATENTS

| Number | Country | Date |
|---|---|---|
| 9,808 of 1907 | Great Britain | Apr. 27, 1908 |